(12) United States Patent
Wang et al.

(10) Patent No.: US 12,339,441 B2
(45) Date of Patent: Jun. 24, 2025

(54) OPTICAL FILM

(71) Applicant: CM VISUAL TECHNOLOGY CORPORATION, Tainan (TW)

(72) Inventors: Tsang-Chi Wang, Tainan (TW); Hsin-Wen Chang, Tainan (TW)

(73) Assignee: CM VISUAL TECHNOLOGY CORPORATION, Tainan (TW)

( * ) Notice: Subject to any disclaimer, the term of this patent is extended or adjusted under 35 U.S.C. 154(b) by 365 days.

(21) Appl. No.: 17/319,017

(22) Filed: May 12, 2021

(65) Prior Publication Data
US 2022/0365341 A1 Nov. 17, 2022

(51) Int. Cl.
*G02B 27/00* (2006.01)

(52) U.S. Cl.
CPC .................. *G02B 27/0081* (2013.01)

(58) Field of Classification Search
CPC .................... G02B 27/0081; Y10T 428/24479
USPC .................................................. 428/156, 161
See application file for complete search history.

(56) References Cited

U.S. PATENT DOCUMENTS

| | | | | |
|---|---|---|---|---|
| 7,940,462 B2 * | 5/2011 | Noguchi | ................ | G02B 1/118 359/619 |
| 2007/0159696 A1 * | 7/2007 | Koizumi | ................ | G02B 5/124 359/530 |
| 2008/0117515 A1 | 5/2008 | Hsu | | |
| 2008/0129184 A1 * | 6/2008 | Nishida | ................ | H01J 31/127 313/484 |
| 2009/0061150 A1 | 3/2009 | Noguchi et al. | | |
| 2020/0011505 A1 * | 1/2020 | Uchida | .................... | G02B 5/09 |

FOREIGN PATENT DOCUMENTS

| | | |
|---|---|---|
| CN | 101359066 A | 2/2009 |
| CN | 102216814 A | 10/2011 |
| CN | 202649646 U | 1/2013 |
| CN | 105093363 A | 11/2015 |
| CN | 106199790 A | 12/2016 |
| CN | 109358447 A | 2/2019 |
| JP | H10-68803 A | 3/1998 |
| JP | 2010-145976 A | 7/2010 |
| JP | 2010217533 A | 9/2010 |
| JP | 2011090104 A | 5/2011 |
| TW | 200422646 A | 11/2004 |
| TW | 201819190 A | 6/2018 |
| TW | 201945811 A | 12/2019 |
| TW | M604898 U | 12/2020 |

* cited by examiner

*Primary Examiner* — Catherine A. Simone
(74) *Attorney, Agent, or Firm* — CKC & Partners Co., LLC

(57) ABSTRACT

The optical film includes a main body and an optical structure. The optical structure protrudes from a surface of the main body. The optical structure includes a first side surface and a second side surface. A first connecting line and a first angle less than 90 degrees are formed between the first side surface and the surface of the main body. A second connecting line and a second angle less than 90 degrees are formed between the second side surface and the surface of the main body. When viewed from a normal vector of the surface of the main body, a third angle is formed between an extension line of the first connecting line and an extension line of the second connecting line, and the third angle is greater than 0 degree and less than 90 degrees.

2 Claims, 7 Drawing Sheets

OPTICAL FILM

BACKGROUND

Field of Invention

The present disclosure relates to an optical film which can provide a clear and broad viewing angle.

Description of Related Art

Manufacturers of displays generally want to give users the best viewing angle, but the viewing angle may be limited due to materials or physical properties. For example, the viewing angle of liquid crystal displays is limited by liquid crystal molecules. In some application scenarios, the displays do not need to be very clear in all directions, which can reduce the difficulty of manufacturing and meet the economic benefits. For example, products such as home TVs and car meters usually need a good horizontal viewing angle, but the vertical viewing angle can be slightly worse. However, how to adjust the viewing angle is a topic of concern to those skilled in the art.

SUMMARY

Embodiments of the present disclosure provide an optical film including a main body and at least one optical structure. The main body has a top surface. The optical structure protrudes from the surface of the main body. The optical structure includes: a first side surface connecting to the surface of the main body, in which a first connecting line and a first angle are formed between the first side surface and the surface of the main body, and the first angle is less than 90 degrees; and a second side surface connecting to the surface of the main body, in which a second connecting line and a second angle are formed between the second side surface and the surface of the main body, and the second angle is less than 90 degrees. When viewed from a normal vector of the surface of the main body, a third angle is formed between an extension line of the first connecting line and an extension line of the second connecting line, and the third angle is greater than 0 degree and less than 90 degrees.

In some embodiments, the optical structure further includes a top surface connecting to the first side surface and the second side surface. The top surface of the optical structure is parallel with the surface of the main body.

In some embodiments, the first side surface is not connected to the second side surface, and a shape of the top surface of the optical structure is a trapezoid.

In some embodiments, the optical structure further includes: a third side surface connecting to the surface of the main body, in which a third connecting line and a fourth angle are formed between the third side surface and the surface of the main body, and the fourth angle is less than 90 degrees; and a fourth side surface connecting to the surface of the main body, in which a fourth connecting line and a fifth angle are formed between the fourth side surface and the surface of the main body, and the fifth angle is less than 90 degrees.

In some embodiments, when viewed from the normal vector of the surface of the main body, a sixth angle is formed between an extension line of the third connecting line and an extension line of the fourth connecting line, and the sixth angle is greater than 0 degree and less than 90 degrees.

In some embodiments, the third angle is formed at a first side of the optical structure, the sixth angle is formed at a second side of the optical structure, and the second side is opposite to the first side.

In some embodiments, the top surface of the optical structure is connected to the third side surface and the fourth side surface.

In some embodiments, a shape of the top surface of the optical structure is a hexagon.

In some embodiments, the optical film further includes a planarization layer over the main body. The planarization layer levels with the top surface of the optical structure, and a refractive index of the planarization layer is different from that of the optical structure.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
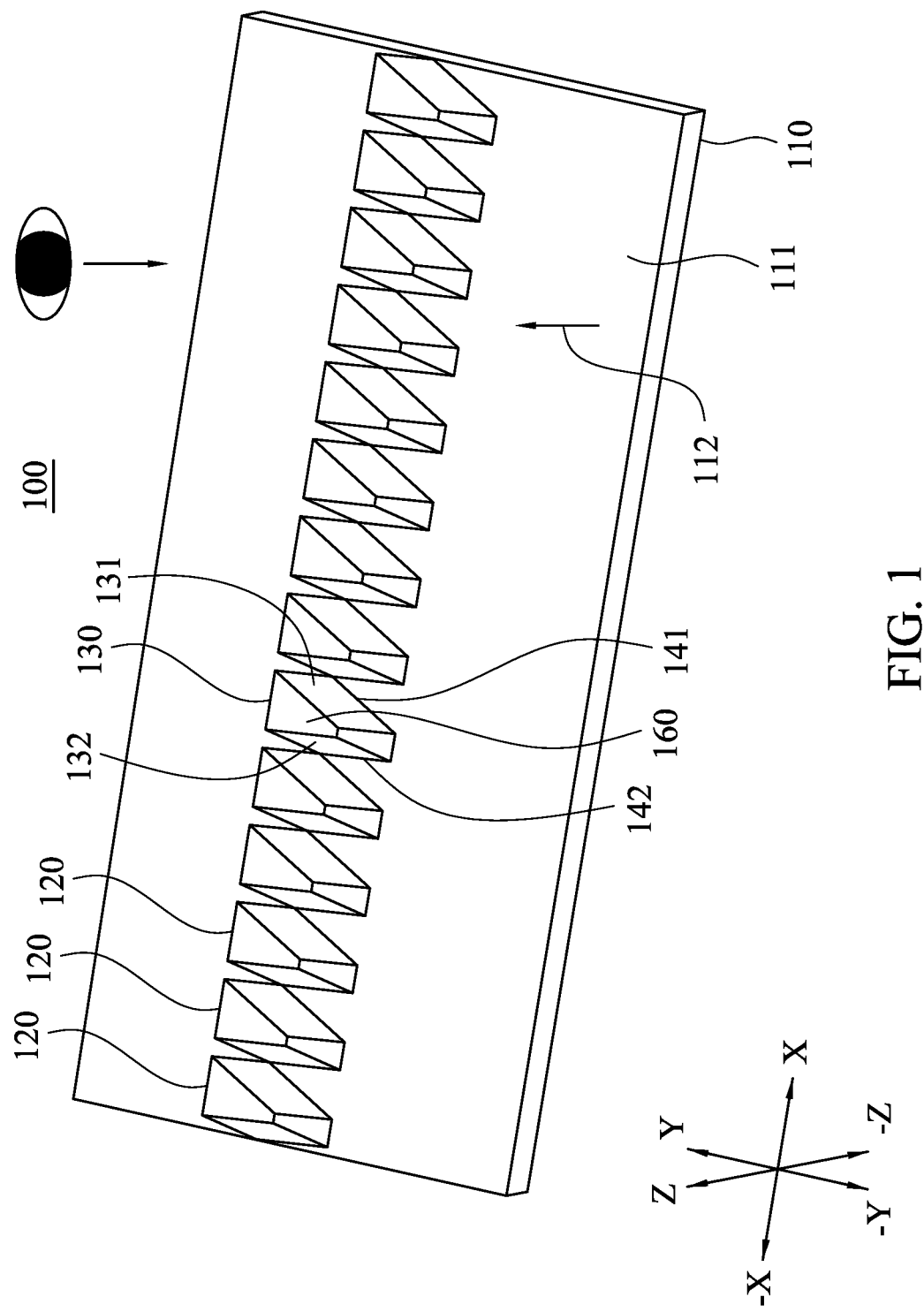
FIG. 1 is a perspective diagram of an optical film in accordance with some embodiments.

FIG. 1 is a perspective diagram of an optical film in accordance with some embodiments. Referring to FIG. 1, an optical film 100 includes a main body 110 and multiple optical structures (e.g. optical structures 120). The main body 110 has a top surface 111 having a normal vector 112. The optical structures 120 protrude from the top surface 111 of the main body 110. In other embodiments, the optical structures 120 may protrude from a bottom surface of the main body 110. In some embodiments, the optical structures 120 may be formed by injection, rolling, or any method. In some embodiments, the material of the optical structures 120 is identical to that of the main body 110. The optical structures 120 are arranged along an X direction in FIG. 2 for simplification, but the optical structure 120 may also be arranged along a Y direction, and that is, the optical structures 120 may be arranged as a matrix across the optical film 100. A user views the optical film 100 from a Z direction. In other words, the user is at the upper side of FIG. 1. The optical film 100 allows the user to have a clear viewing angle in the X direction and −X direction, and also a clear viewing angle in the −Y direction. An optical structure 130 is taken as an example for detailed description.

Figure 2:
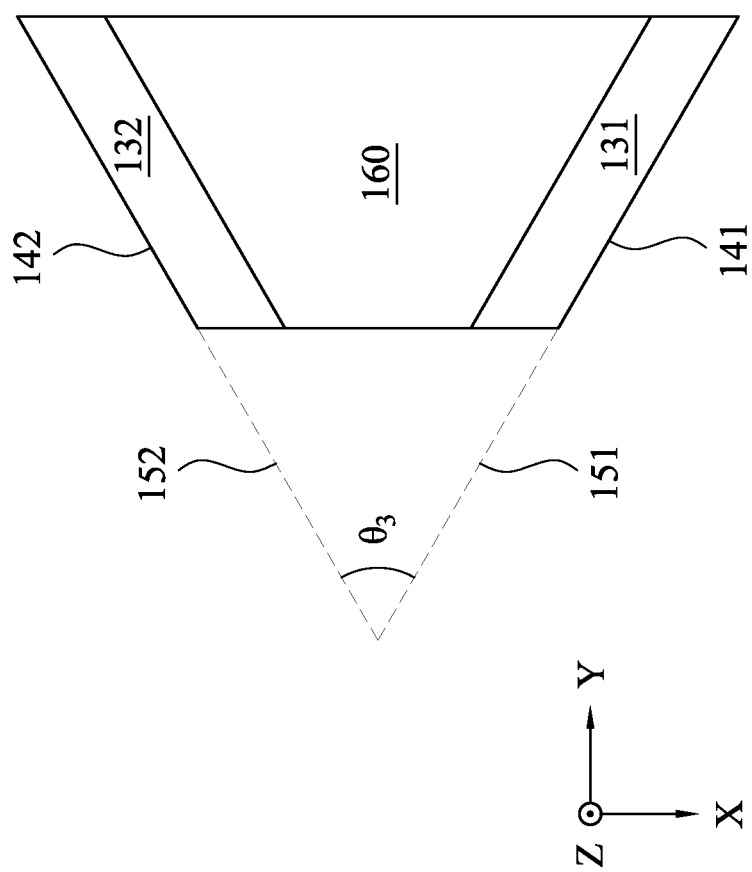
FIG. 2 is a top view of the optical structure in accordance with some embodiments.
Figure 3:
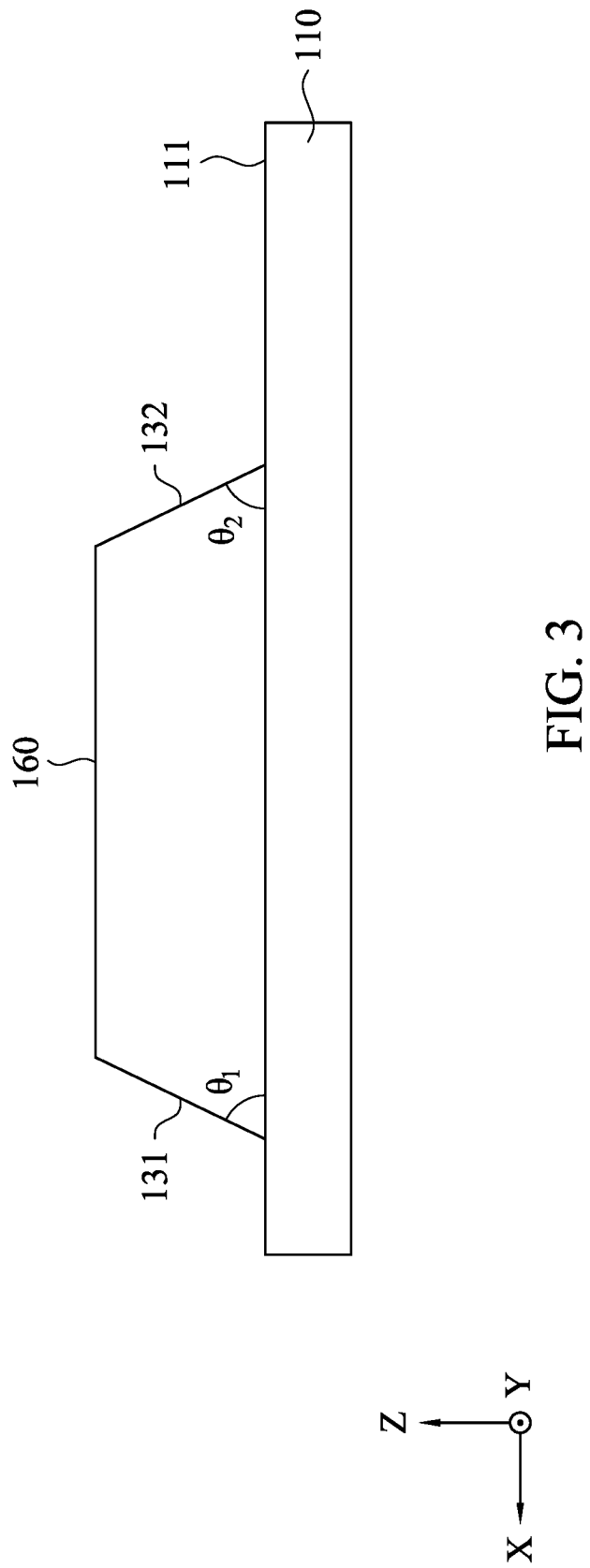
FIG. 3 is a side view of the optical structure in accordance with some embodiments.

FIG. 2 is a top view of the optical structure 130 in accordance with some embodiments. FIG. 3 is a side view from the back of the optical structure 130 in accordance with some embodiments. Referring to FIG. 1 to FIG. 3, the optical structure 130 has a first side surface 131, a second side surface 132, and a top surface 160. The top surface 160 is connected to the first side surface 131 and the second side surface 132. In the embodiments, a shape of the top surface 160 is a trapezoid. In some embodiments, the top surface 160 of the optical structure 130 is parallel with the top surface 111 of the main body 110.

The first side surface 131 is connected to the top surface 111 of the main body 110. A first connecting line 141 and a first angle $\theta_1$ are formed between the first side surface 131 and the top surface 111. The first angle $\theta_1$ is less than 90 degrees. In addition, the second side surface 132 is also connected to the top surface 111 of the main body 110. A second connecting line 142 and a second angle $\theta_2$ are formed between the second side surface 132 and the top surface 111. The second angle $\theta_2$ is less than 90 degrees. The light enters the main body 110 from below. If the output light is represented as vectors, then some vectors would have non-zero components in the X direction and some other vectors would have non-zero components in the −X direction due to the first angle $\theta_1$ and the second angle $\theta_2$. Therefore, the user can see clear images from the X direction and −X direction.

When viewed from the normal vector 112, a third angle $\theta_3$ is formed between an extension line 151 of the first connecting line 141 and an extension line 152 of the second connecting line 142. The third angle $\theta_3$ is greater than 0 degree and less than 90 degrees. In some embodiments, the third angle $\theta_3$ is greater than 10 degrees and less than 120 degrees. The output light would have non-zero component at the −Y direction due to the third angle $\theta_3$. From another aspect, the normal vector of the first side surface 131 is represented as $\vec{V_1}=(a1,b1,c1)$, and the normal vector of the second side surface 132 is represented as $\vec{V_2}=(a2,b2,c2)$ where a1 and a2 are components in the X direction, b1 and b2 are components in the Y direction, and c1 and c2 are components in the Z direction. A cross product $\vec{V_1} \times \vec{V_2}$ of these two vectors would have non-zero component in the Z direction.

Figure 4:
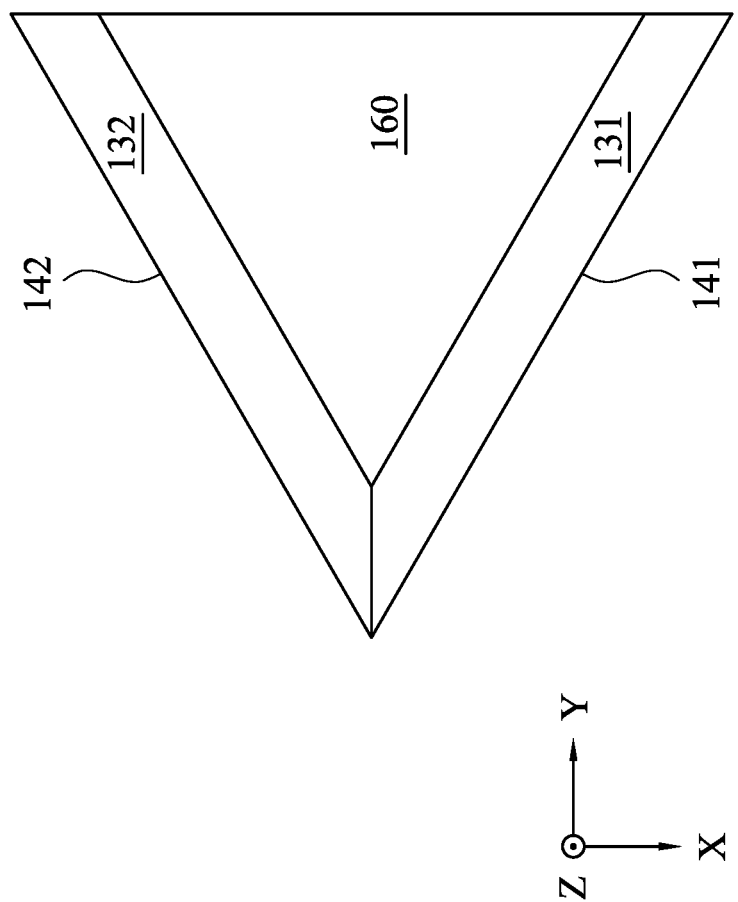
FIG. 4 is a top view of the optical structure in accordance with some embodiments.

The first side surface 131 is not connected to the second side surface 132 in the embodiment, but the first side surface 131 may be connected to the second side surface 132 in other embodiments. For example, in the embodiment of FIG. 4 which is a top view of the optical structure, the shape of the top surface 160 of the optical structure is a triangle.

Figure 5:
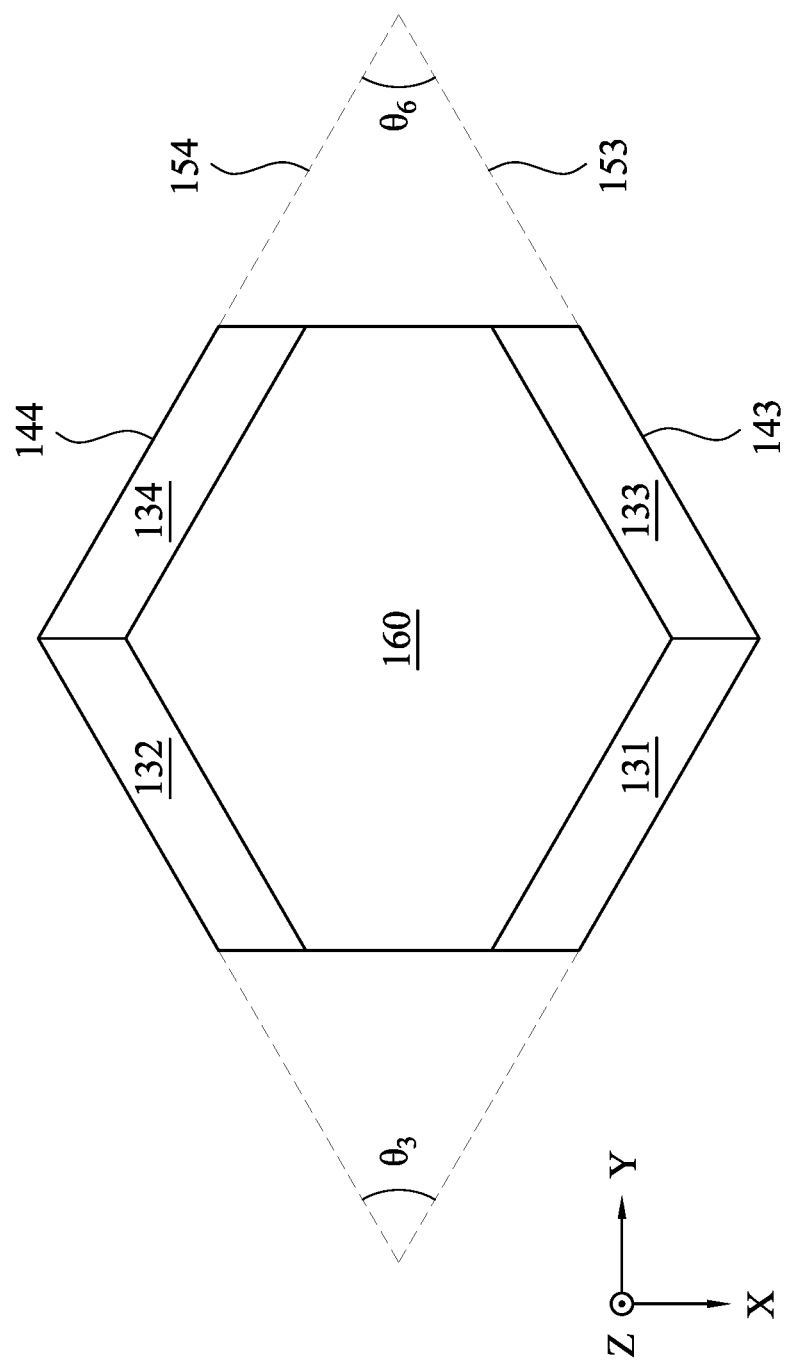
FIG. 5 is a top view of the optical structure in accordance with some embodiments.
Figure 6:
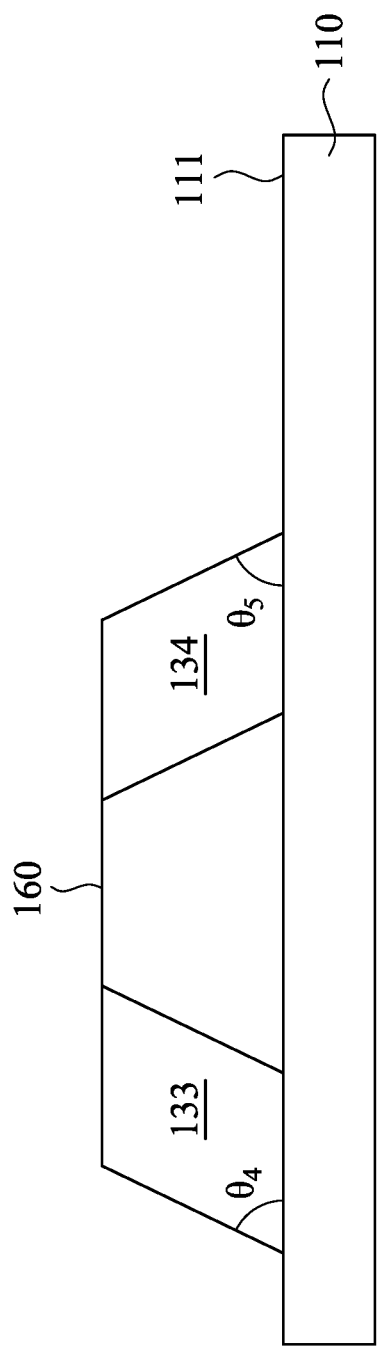
FIG. 6 is a side view from the back of the optical structure of FIG. 5.

In some embodiments, the top surface 160 of the optical structure may be a rhombus, a hexagon or any other shape. For example, FIG. 5 is a top view of the optical structure in accordance with some embodiments. FIG. 6 is a side view from the back of the optical structure of FIG. 5. Referring to FIG. 5 and FIG. 6, in the embodiment, the optical structure further includes a third side surface 133 and a fourth side surface 134. The top surface 160 is connected to the third side surface 133 and the fourth side surface 134. A shape of each of the first side surface 131, the second side surface 132, the third side surface 133, and the fourth side surface 134 is a parallelogram.

A third connecting line 143 and a fourth angle $\theta_4$ are formed between the third side surface 133 and the top surface 111 of the main body 110. The fourth angle $\theta_4$ is less than 90 degrees. A fourth connecting line 144 and a fifth angle $\theta_5$ are formed between the fourth side surface 134 and the top surface 111 of the main body 110. The fifth angle $\theta_5$ is less than 90 degrees. When viewed from the normal vector 112, a sixth angle $\theta_6$ is formed between an extension line 153 of the third connecting line 143 and an extension line 154 of the fourth connecting line 144. The sixth angle $\theta_6$ is greater than 0 and less than 90 degrees. In some embodiments, the sixth angle $\theta_6$ is greater than 30 degrees and less than 60 degrees. As a result, the output light would have non-zero component in the Y direction due to the sixth angle $\theta_6$. Note that in FIG. 5, the third angle $\theta_3$ is formed at the left-hand side of the optical structure in the −Y direction, and the sixth angle $\theta_6$ is formed at the right-hand side of the optical structure in the Y direction. Therefore, the user can see clear images from both of the Y direction and the −Y direction.

Figure 7:
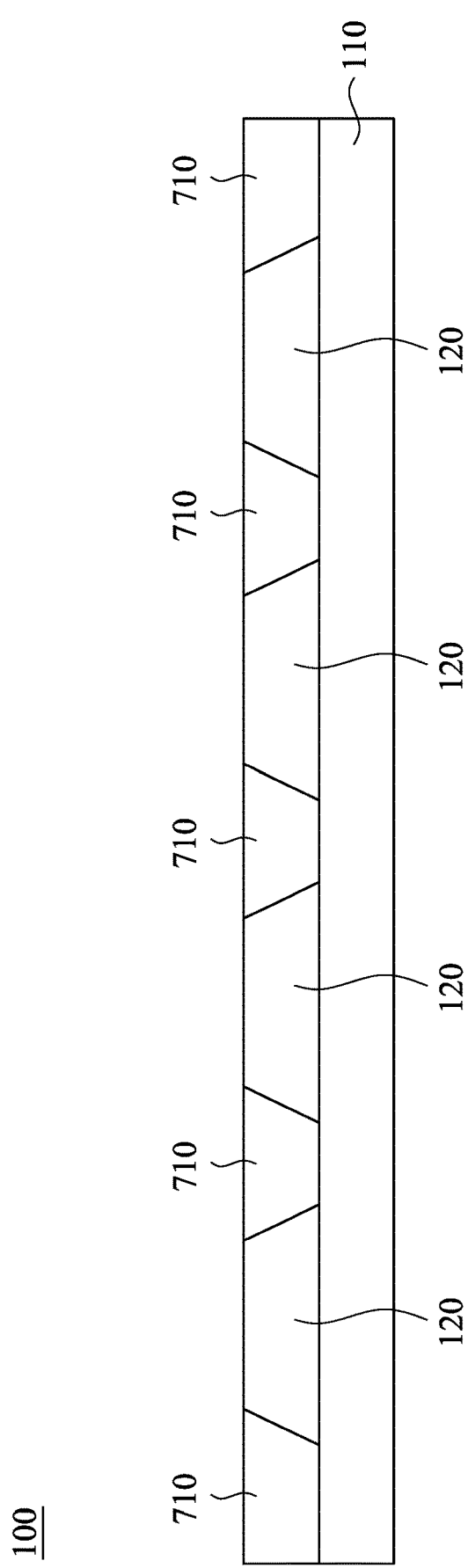
FIG. 7 is a side view of the optical film in accordance with some embodiments.

FIG. 7 is a side view of the optical film in accordance with some embodiments. In the embodiment of FIG. 7, the optical film 100 further includes a planarization layer 710 over the main body 110. The planarization layer 710 fills the gaps between the optical structures 120 and levels with the top surfaces of the optical structures 120. The refractive index of the planarization layer 710 is different from that of the optical structures 120.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical film, comprising:
    a main body having a surface, wherein light enters the main body from a below side which is opposite to the surface;
    at least one optical structure protruding from the surface of the main body, wherein the at least one optical structure comprises:
        a first side surface connecting to the surface of the main body, wherein a first connecting line and a first angle are formed between the first side surface and the surface of the main body, and the first angle is less than 90 degrees;
        a second side surface connecting to the surface of the main body, wherein a second connecting line and a second angle are formed between the second side surface and the surface of the main body, and the second angle is less than 90 degrees, wherein when viewed from a normal vector of the surface of the main body, the first side surface is located at a X direction of the at least one optical structure, the second side surface is located at a −X direction of the at least one optical structure, a third angle is formed between an extension line of the first connecting line and an extension line of the second connecting line at a −Y direction of the at least one optical structure, and the third angle is greater than 0 degree and less than 90 degrees;

a third side surface connecting to the surface of the main body, wherein a third connecting line and a fourth angle are formed between the third side surface and the surface of the main body, and the fourth angle is less than 90 degrees;

a fourth side surface connecting to the surface of the main body, wherein a fourth connecting line and a fifth angle are formed between the fourth side surface and the surface of the main body, and the fifth angle is less than 90 degrees, when viewed from the normal vector of the surface of the main body, the third side surface is located at the X direction of the at least one optical structure, the fourth side surface is located at the −X direction of the at least one optical structure, a sixth angle is formed between an extension line of the third connecting line and an extension line of the fourth connecting line at a Y direction of the at least one optical structure, and the sixth angle is greater than 0 degree and less than 90 degrees; and a top surface connecting to the first side surface, the second side surface, the third side surface, and the fourth side surface, wherein a shape of the top surface is a hexagon, and a shape of each of the first side surface, the second side surface, the third side surface and the fourth side surface is a parallelogram, and wherein output light has non-zero components in the X direction, the −X direction, the Y direction, and the −Y direction; and a planarization layer over the main body, wherein the planarization layer levels with the top surface of the at least one optical structure, and a refractive index of the planarization layer is different from that of the at least one optical structure.

2. The optical film of claim 1, wherein the top surface of the at least one optical structure is parallel with the surface of the main body.

* * * * *